United States Patent [19]

Bednarzik

[11] Patent Number: 5,020,275
[45] Date of Patent: Jun. 4, 1991

[54] WATERING METHOD AND APPARATUS FOR PLANTS

[76] Inventor: Uwe H. Bednarzik, 264 Altamonte Bay Club Cir. 102, Altamonte Springs, Fla. 32701

[21] Appl. No.: 597,386
[22] Filed: Oct. 15, 1990
[51] Int. Cl.$^5$ .................. A01G 25/00; A01G 29/00
[52] U.S. Cl. .................................. 47/79; 137/78.3; 47/48.5
[58] Field of Search .................... 47/79–83, 47/67, 39, 48.5; 137/78.3

[56] References Cited

U.S. PATENT DOCUMENTS

| | | | |
|---|---|---|---|
| 608,664 | 8/1898 | Free | 47/79 |
| 2,810,235 | 10/1957 | Magid | 47/81 |
| 3,552,058 | 1/1971 | Fici | 47/38 |
| 3,753,315 | 8/1973 | Adam | 47/38 |
| 3,769,748 | 11/1973 | Goldring | 47/38.1 |
| 4,739,789 | 4/1988 | Hamilton | 137/78.3 |
| 4,756,121 | 7/1988 | Wild | 47/80 |
| 4,760,666 | 8/1988 | Han | 47/79 |
| 4,825,591 | 5/1989 | Han | 47/67 |
| 4,965,963 | 10/1990 | Lyon | 47/79 |

Primary Examiner—David A. Scherbel
Assistant Examiner—Michele A. Van Patten
Attorney, Agent, or Firm—James H. Beusse

[57] ABSTRACT

A method and apparatus for automatically watering and moderating the ambient temperature of a plurality of potted plants. Each plant is placed in an inner pot which is positioned within a larger outer pot. Each inner pot has an aperture in its bottom surface with a nozzle extending therethrough. Apparatus is placed in the bottom of each outer pot and cooperates with the nozzle to selectively prevent water flow into the inner pot when soil in the inner pot contains a preselected amount of moisture. Each outer pot is coupled to a water source through a respective water line. Water is admitted into the outer pots until the water level reaches a preselected level to regulate the amount of water admitted to the inner pot. For temperature moderation, controlled temperature water may be selectively admitted into and discharged from the water lines to the plants to maintain the temperature of water in the water lines at a preselected value. Temperature about the plants is moderated by convection heating from the water.

7 Claims, 1 Drawing Sheet

U.S. Patent
June 4, 1991
5,020,275
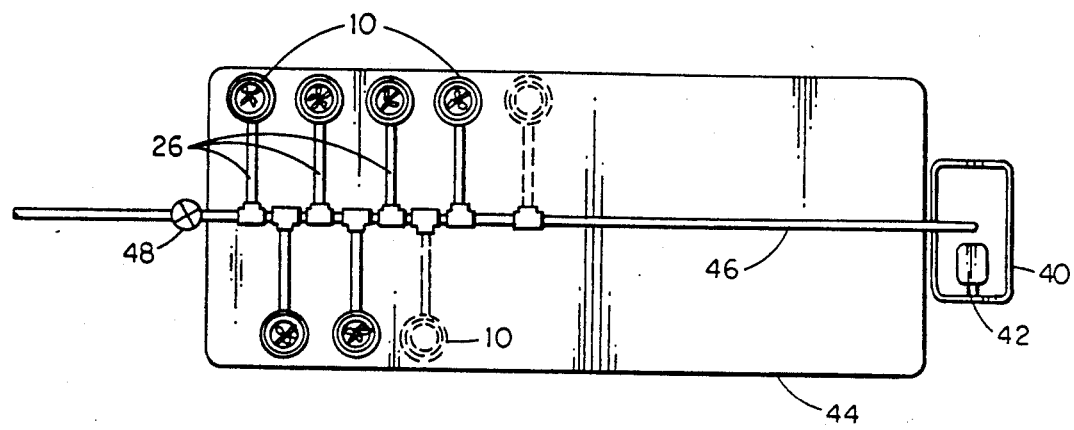
FIG. 3
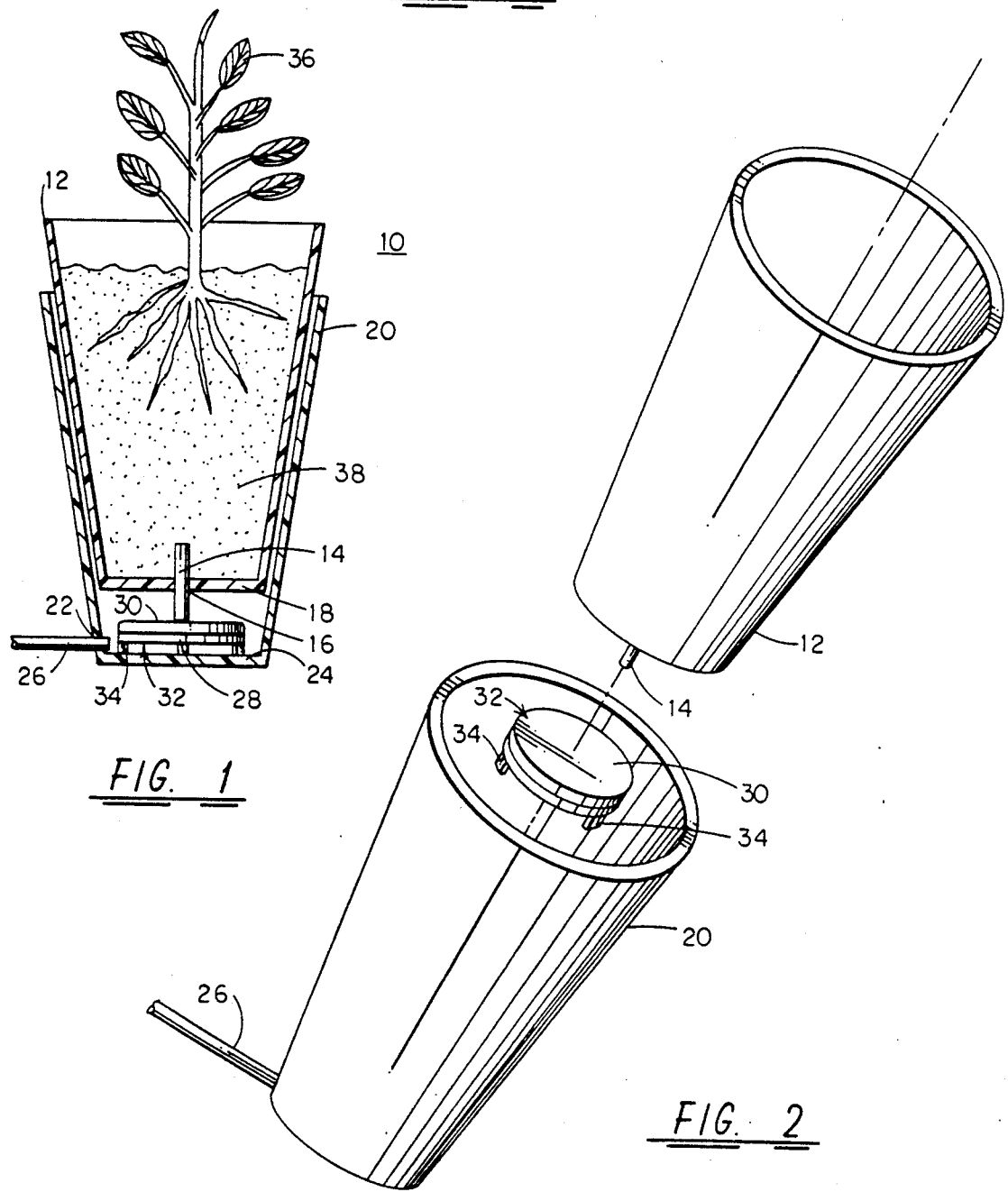
FIG. 1
FIG. 2

WATERING METHOD AND APPARATUS FOR PLANTS

This invention relates to automatic watering devices and temperature moderators for greenhouse plants and, more particularly, to a watering method and apparatus which automatically waters a plant in response to water loss and can be adjusted to moderate temperature at the plant during unusually hot or cold weather.

BACKGROUND OF THE INVENTION

Various arrangements for automatic irrigation of potted plants are well known in the art. U.S. Pat. No. 3,753,315 is illustrative of a double pot system in which an aperture is located on or near the bottom of an inner pot and a sponge located between the bottom of the inner container and above the inside bottom of an outer container. Water is transferred from the outer container to a cavity containing the sponge and, through capillary action, the water moves upwardly from the sponge through the aperture in the inner pot to moisten the plant soil. One problem associated with such a device has been the difficulty of controlling the amount of water transferred to the plant. Quite often such types of planters have not proved satisfactory as soil often becomes water saturated and causes rotting of the plant roots. U.S. Pat. No. 3,552,058 illustrates another form of double pot system in which a mass of earth provides the function of the sponge in the aforementioned U.S. Pat. No. 3,753,315.

Another form of automatic watering device is shown in U.S Pat. No. 4,825,591 in which a plant hangs from one end of a vertical rod with a spring at the opposite end of the rod for actuating a valve in a water tank. As the soil dries and becomes lighter, the spring lifts the plant and triggers a water tank valve to open and water the plant. The complexity of this apparatus makes it unsuitable for greenhouse use where multitudes of plants are growing. Furthermore, the complexity of the apparatus makes it susceptible to high failure rates and its size and complexity are not cost effective for mass watering.

SUMMARY OF THE INVENTION

It is an object of the present invention to provide an improved method and apparatus for automatically irrigating plants which overcomes the above and other disadvantages of the prior art.

It is another object of the present invention to provide an improved method and apparatus for automatic irrigation of plants which is simple in construction and suitable for use with large quantities of plants.

It is yet another object of the present invention to provide a method and apparatus for automatic irrigation of plants which is responsive to dryness of the soil at the plant roots for initiating irrigation.

It is still another object of the present invention to provide a method and apparatus for automatic irrigation of plants which also is capable of moderating temperature in the vicinity of the plant.

In accordance with one form of the present invention, there is provided an inner pot for receiving a plant and associated planting soil and an outer pot surrounding the inner pot. The inner pot has an aperture located in its bottom surface through which a nozzle extends. The outer pot has an aperture adjacent its bottom for connection to a water line. A support, preferably comprising a thin, rubber diaphragm stretched over a short cylindrical member, sits on the inside bottom surface of the outer pot. When the inner pot is at its lowest point within the outer pot, the nozzle rests on the diaphragm and acts as a plug to block the diaphragm. When water is allowed to flow into the outer pot through the water line connected to the aperture located therein, the inner pot will begin to float when the volume of water it displaces weighs more than the inner pot and its contents. Assuming that a plant is potted in the inner pot and that it is relatively dry, such floating will cause the nozzle to rise above the diaphragm and allow water to enter the inner pot through the nozzle. The water will be drawn into soil in the inner pot until the combined weight of the plant, water, and soil becomes heavier than the displaced water in the outer pot and causes the inner pot to return to its resting position with the nozzle contacting the diaphragm. The thin, rubber diaphragm acts as a positive water seal with the inner pot in its resting position since the water pressure from the bottom of the diaphragm is greater than the water/air pressure in the nozzle. As the water in the inner pot is used and evaporates, the inner pot becomes lighter and the above described cycle repeats. The amount of water allowed to enter the inner pot can be controlled by adjusting the level to which water fills the outer pot.

For use in a greenhouse, a plurality of the above described pots are connected to a common water line. The pots may be arranged on tables of similar plants in identically sized pots with a common float control valve for regulating the level of water in the outer pots. During cold weather, the water line may be provided with a valve at an end remote from the float control valve which can be opened to maintain a constant water flow through the line. By using heated water in the system, sufficient heat can be transferred to the plants by water flow to protect the plants from freezing. The plants can also be cooled during hot weather by using cool water in the system. Fertilizer can be added to the water for feeding the plants while watering.

BRIEF DESCRIPTION OF THE DRAWINGS

For a better understanding of the present invention, reference may be had to the following detailed description taken in conjunction with the accompanying drawings in which:

FIG. 1 is a cross-sectional view of a double plant pot arrangement in accordance with the present invention;

FIG. 2 is an exploded vieW of the double plant pot arrangement of FIG. 1; and

FIG. 3 is a plan view of an automatic plant watering system for a plurality of plants in accordance with one aspect of the present invention.

DETAILED DESCRIPTION OF THE INVENTION

FIG. 1 is a cross-sectional view of one form of double pot arrangement 10 in accordance with the teachings of the present invention. The arrangement 10 includes an inner pot 12 having a capillary tube or nozzle 14 extending through an aperture 16 in a bottom 18 of the pot. The inner pot 12 fits within an outer pot 20. As will become apparent, the relative sizing of the pots 12 and 20 is not important so long as the inner pot can fit loosely within the outer pot. The outer pot 20 is provided with an aperture 22 adjacent its bottom 24 for connecting to a water line 26. Seated on the bottom 24 is a support 28 comprising a thin, rubberoid diaphragm 30 stretched over an upper rim of a cylindrical member 32. The member 32 is preferably supported on legs 34 to allow water to flow under the table and exert a force on the lower side of the diaphragm. However, it will be appreciated that it is only necessary that water be able to enter the space below the diaphragm 30 and for that purpose any portal, slot, or other opening could be provided in the member 32. The diaphragm 30 may be formed of any suitable stable material such as, for example, latex, neoprene, or silicone. FIG. 2 is an exploded, perspective view of the arrangement 10 better showing the diaphragm 30 and its positioning with respect to nozzle 14. While support 28 is shown as cylindrical, it will be recognized that the support could take other shapes.

Assuming that a plant 36 and potting soil 38 are placed in inner pot 12 and that initially there is no water within pot 20, the pot 12 will settle into pot 20 until nozzle 14 rests on diaphragm 30 of support 28. If water is then allowed to flow into pot 20 through water line 26, the pot 12 and its contents will begin to float when the volume of water displaced by pot 12 equals the weight of pot 12 and its contents. As the water rises, pot 12 will rise and the nozzle 14 will separate from diaphragm 30. It will be seen that the separation of nozzle 14 from diaphragm 30 will require some incremental movement of the pot 12 since water pressure under member 32 will push the thin diaphragm towards the nozzle 14 due to the lower pressure within the nozzle. Once the nozzle 14 separates from the diaphragm 30, water will flow into nozzle 14 and immediately into soil 38 by capillary action and percolation. The reaction between diaphragm 30 and nozzle 14 in requiring incremental movement of inner pot 12 before separation of the nozzle from the diaphragm provides a degree of hysteresis necessary to cause the diaphragm to act as a positive shut-off valve and prevent leakage of water into the pot 12 when the soil therein is adequately wet. So long as the combined weight of pot 12, plant 36, soil 38, and the moisture absorbed by soil 38 weigh less than the displaced volume of water in the outer pot 20, pot 12 will continue to float and allow additional moisture to be absorbed by the soil through nozzle 14. When a preselected volume of water has been absorbed by the soil 38, the pot 12 will fall to a point at which nozzle 14 contacts diaphragm 30 and shuts off the flow of water into pot 12. As stated above, the hysteresis effected by diaphragm 30 will force drying of soil 38 beyond that required to just balance pot 12 before additional water is allowed to again flow into pot 12. Such drying is useful in stimulating plant growth.

Turning now to FIG. 3, there is shown a plan view of an exemplary greenhouse arrangement using the teaching of the present invention. A plurality of double pot arrangements 10 are situated on a typical support table 44 with each pot 20 connected by its associated water line 26 to a central main water line 46. Main line 46 preferably extends along the center of table 44 allowing access to each side for connection to the pots 20 spaced thereabout. One end of line 46 connects to a water reservoir 40 of the type having a float valve 42 for controlling the level of water in the reservoir. A primary water supply, city system, or pump (not shown) is connected to supply water to reservoir 40. Reservoir 40 and float valve 42 may be of a type well known in the art, including, for simplicity, the type commonly used in flush commodes. The float valve 42 responds to dropping of the water level in reservoir 40 by opening and allowing water from the primary water supply to flow into the reservoir until a preset level is reached. By adjusting the level of water in reservoir 40 or by adjusting the vertical position of the reservoir, the level of water in the pots 20 can be regulated. In practice, the table 44 is level so that all the pots 20 are at the same level and therefore have the same water height. Individual levels of water in selected ones of the pots 20 can be adjusted by changing the position of the pot, e.g., by placing a support under a pot to raise it above the table 44.

The system of FIG. 3 is also useful in moderating ambient temperature about plants 36 by controlling the temperature of water introduced to the plants. For such control, there is also required a valve 48 which can be opened to allow a continuous flow of water through the system. In cold weather, warm water can be placed in reservoir 40 and allowed to flow to the plants 36. The water will not only warm the plant root area, convection heating will also warm the general area surrounding the plants. For effective use of this system for heating, it may be desirable to cycle the system such that water is drained out through valve 48 prior to admitting additional water into lines 26 and 46. The cycling process can be readily achieved in various manners such as, for example, by using electrically controlled valves for valves 48 and 42 which can be time controlled to cycle on and off in an alternating sequence. If it is desirable to cool the area of the plants 36, cool water could be substituted for warm water.

While the principles of the present invention have now been made clear in the illustrative embodiment, it will become apparent to those skilled in the art that many modifications of the structures, arrangements, and components presented in the above illustrations may be made in the practice of the invention in order to develop alternative embodiments suitable to specific operating requirements without departing from the spirit and scope of the invention as set forth in the appended claims.

What is claimed is:

1. Apparatus for automatic irrigation of a potted plant comprising:
   a first pot adapted for receiving a plant and a sufficient volume of soil to support the plant, the first pot including at least one aperture in the bottom thereof and a corresponding nozzle projecting from the at least one aperture for a preselected distance;
   a second pot having at least a larger diameter than said first pot wherein said first pot fits loosely within said second pot, said second pot including means for connection to a water line for admitting water thereinto; and
   means positioned in said second pot and operable with said nozzle for selectively admitting water into said first pot when the weight of said first pot becomes less than a preselected value.

2. The apparatus of claim 1 wherein said means for selectively admitting water into said first pot comprises a support member positioned on an inner bottom surface of said second pot, said support member having a thin, flexible diaphragm stretched across a top thereof, said diaphragm being responsive to a pressure differential thereacross when said nozzle is in contact with said diaphragm for urging said diaphragm into said nozzle to thereby establish a positive valve action.

3. The apparatus of claim 2 wherein said support member comprising a thin, cylindrical member supported on at least three legs with said diaphragm stretched across a cylindrical upper surface.

4. The apparatus of claim 1 wherein said means for connection to a water line comprises an aperture adjacent a bottom surface of said second pot.

5. The apparatus of claim 1 and including a water reservoir coupled thereto for regulating the level of water in said outer pot for controlling the moisture introduced into said first pot.

6. The apparatus of claim 5 and including a plurality of first and second pots each coupled to said reservoir via respective water lines coupled to a common line from said reservoir, ambient temperature adjacent said pots being moderated by controlling the temperature of the water in said reservoir.

7. The apparatus of claim 6 and including valve means connected to said common line for periodically draining water therefrom whereby water at the preselected temperature can be injected into said water lines.

* * * * *